(12) United States Patent
Uchida et al.

(10) Patent No.: US 9,851,493 B2
(45) Date of Patent: Dec. 26, 2017

(54) BACKLIGHT DEVICE AND DISPLAY APPARATUS

(71) Applicant: Sakai Display Products Corporation, Sakai-shi, Osaka (JP)

(72) Inventors: Takashi Uchida, Sakai (JP); Motoaki Okitsu, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 341 days.

(21) Appl. No.: 14/417,022

(22) PCT Filed: Mar. 13, 2014

(86) PCT No.: PCT/JP2014/056742
§ 371 (c)(1),
(2) Date: Jan. 23, 2015

(87) PCT Pub. No.: WO2014/148362
PCT Pub. Date: Sep. 25, 2014

(65) Prior Publication Data
US 2015/0177449 A1 Jun. 25, 2015

(30) Foreign Application Priority Data
Mar. 19, 2013 (JP) ................................. 2013-057068

(51) Int. Cl.
*F21V 7/04* (2006.01)
*F21V 8/00* (2006.01)
(Continued)

(52) U.S. Cl.
CPC ......... *G02B 6/0088* (2013.01); *G02B 6/0073* (2013.01); *G02B 6/0085* (2013.01);
(Continued)

(58) Field of Classification Search
CPC .. G02B 6/0073; G02B 6/0085; G02B 6/0088; G02B 6/0091; G02F 1/133308
(Continued)

(56) References Cited

U.S. PATENT DOCUMENTS

| 6,424,391 B1* | 7/2002 | Tsukamoto | ....... G02F 1/133308 349/58 |
| 2005/0264714 A1* | 12/2005 | Hwang | ............. G02F 1/133308 349/58 |

(Continued)

FOREIGN PATENT DOCUMENTS

| CN | 1337588 A | 2/2002 |
| WO | WO2008090646 A1 | 7/2008 |

*Primary Examiner* — Tsion Tumebo
(74) *Attorney, Agent, or Firm* — Rudy J. Ng; Bret E. Field; Bozicevic, Field & Francis LLP

(57) ABSTRACT

The backlight device included in the display apparatus is provided with: a light guide plate, a front chassis (pressing member) disposed at the front side of the light guide plate; and a heat sink (supporting member) having a plate-shaped connecting part (connecting plate) disposed at the side of the light guide plate, to be connected with other members. A through hole is formed in the connecting part, and a nut, which is necessary for connecting a bezel and the front chassis with a screw, is press-fitted into the through hole. A portion of the front side end of the connecting part, which is closest to a through hole, is a recessed part. Even if the front side end of the connecting part is deformed by the press-fitting of the nut into the through hole, the recessed part counteracts the deformation, and the connecting part does not interfere with the front chassis. Therefore, positional deviation of the front chassis and the light guide plate does not occur.

12 Claims, 9 Drawing Sheets

(51) Int. Cl.
*G02F 1/1333* (2006.01)
*G02F 1/1335* (2006.01)

(52) U.S. Cl.
CPC ..... *G02B 6/0091* (2013.01); *G02F 1/133308* (2013.01); *G02F 1/133615* (2013.01); *G02F 2001/133317* (2013.01); *G02F 2001/133322* (2013.01); *G02F 2001/133628* (2013.01); *G02F 2201/46* (2013.01)

(58) Field of Classification Search
CPC ... G02F 1/133615; G02F 2001/133317; G02F 2001/133322; G02F 2001/133628; G02F 2201/46
USPC ......................................................... 362/611
See application file for complete search history.

(56) References Cited

U.S. PATENT DOCUMENTS

| | | | | |
|---|---|---|---|---|
| 2007/0273808 | A1* | 11/2007 | Hsu | G02F 1/133308 349/58 |
| 2010/0073959 | A1* | 3/2010 | Hamada | G02B 6/0085 362/611 |
| 2012/0002129 | A1* | 1/2012 | Azai | G02F 1/133308 349/58 |
| 2013/0010497 | A1* | 1/2013 | Lee | G02B 6/0088 362/611 |
| 2013/0271692 | A1* | 10/2013 | Kuo | G02F 1/133308 349/58 |

\* cited by examiner

BACKLIGHT DEVICE AND DISPLAY APPARATUS

This application is the national phase under 35 U.S.C. §371 of PCT International Application No. PCT/JP2014/056742 which has an International filing date of Mar. 13, 2014 and designated the United States of America.

BACKGROUND

1. Technical Field

The present invention relates to an edge-light type backlight device that illuminates a display panel for displaying an image, and a display apparatus.

2. Description of Related Art

A display apparatus displaying an image with a non-light emitting type display panel such as a liquid crystal panel is provided with a backlight device that illuminates a display panel from behind. Some of the backlight devices are of an edge-light type in which a light guide plate is disposed behind a display panel and a light source is disposed opposite to the edge face of the light guide plate. In an edge-light type backlight device, light from a light source enters the edge face of a light guide plate, travels through the light guide plate, and is emitted from a flat surface of the light guide plate. For example, a light emitting diode (LED) is used as a light source. In Pamphlet of International Patent Publication No. WO 2008/090646, an edge-light type backlight device is disclosed.

A surface emitting light to a display panel is regarded as a front surface. A light guide plate is held between a supporting member with a part thereof being disposed at the back side of the light guide plate to support the light guide plate from the back side and a pressing member with a part thereof being disposed at the front side of the light guide plate to press the light guide plate from the front side. A display apparatus is provided with: the display panel disposed at the front side of the pressing member; and a bezel that covers the peripheral edge of the display panel and the sides of the display apparatus. The display panel is secured between the pressing member and the bezel. The supporting member is made of metal, and functions as, for example, a heat sink with the light source being fixed.

To achieve the reduction in thickness of a display apparatus and in width of the frame, the number of components has been reduced, hence a supporting member now has a function to be connected with a bezel. The supporting member has a plate-shaped connecting part disposed at a side of the light guide plate to be connected with the bezel with screws. The front side end of the connecting part is opposite to a pressing member. Some supporting members used as heat sinks are made of metal which is softer than iron such as aluminum to enhance heat dissipation. When a screw hole is formed directly in the connecting part of such a supporting member, the strength of a screw thread is low, thus repetitive fastening with a screw easily damages the screw thread. Hence, a nut is sometimes used to be embedded in the connecting part to secure the bezel to the connecting part with the screw. A through hole is formed in the connecting part. The nut is press-fitted into this through hole, thereby being embedded in the connecting part.

SUMMARY OF THE INVENTION

When the nut is press-fitted into the through hole of the connecting part, the connecting part deforms in such a manner that the through hole is slightly expanded. The front side end of the connecting part, being close to the through hole, deforms so as to protrude to the front side in accordance with the deformation of the connecting part when the nut is press-fitted therein. The end of the connecting part which deforms toward the front side pushes the pressing member away from the light guide plate. This may make it difficult for the pressing member to hold the light guide plate and cause positional deviation of the light guide plate. The positional deviation of the light guide plate causes positional deviation of the edge face of the light guide plate from a light path of incident light, then the amount of the incident light on the edge face of the light guide plate and the amount of light illuminating the display panel are reduced, and a screen displaying an image becomes dark. Additionally, light not entering the light guide plate leaks, causing the leaked light. This generates luminance unevenness of the display screen, which is visually recognized by a user, and deteriorates display quality of the image.

The present invention has been contrived in view of the above circumstances. An object of the invention is to provide a backlight device and a display apparatus that prevent the deterioration in display quality due to the positional deviation of the light guide plate by making allowance for the deformation of the connecting part in the configuration.

A backlight device according to the present invention, is characterized by comprising: a light source; a light guide plate with an edge face receiving light entering from the light source and with a flat surface emitting light; a pressing member for pressing a part of the flat surface side of the light guide plate; and a connecting plate disposed in non-parallel at a side of the light guide plate, to be connected with another member and having an end being opposite to the pressing member, wherein, a through hole is formed in the connecting plate, and a closest portion which is a portion of the end of the connecting plate and is closest to the through hole or an opposing portion which is a portion of the pressing member and is opposite to the closest portion is recessed.

A backlight device according to the present invention, is characterized by comprising: a light source; a light guide plate with an edge face receiving light entering from the light source and with a flat surface emitting light; a supporting member with a part being disposed at a back side of the flat surface of the light guide plate, for supporting the light guide plate; and a pressing member with a part being disposed at the light emitting surface side of the light guide plate, for pressing the light guide plate between the pressing member and the supporting member, wherein the supporting member includes a connecting plate disposed in non-parallel at a side of the light guide plate, to be connected with another member and having an end being opposite to the pressing member, a through hole is formed in the connecting plate, and a closest portion which is a portion of the end of the connecting plate and is closest to the through hole or an opposing portion which is a portion of the pressing member and is opposite to the closest portion is recessed.

In the backlight device according to the present invention, the closest portion or the opposing portion is recessed for a length greater than a diameter of the through hole.

In the backlight device according to the present invention, a nut is press-fitted and fixed in the through hole, and said another member is connected to the connecting plate with a screw being threaded into the nut.

In the backlight device according to the present invention, the connecting plate is made of metal, and the light source is fixed on the connecting plate.

A display apparatus according to the present invention, is characterized by comprising: a display panel for displaying an image; and the backlight device according the present invention for illuminating the display panel.

In the present invention, the backlight device included in the display apparatus has: the light source; the light guide plate; the pressing member disposed at the light emitting side of the light guide plate; and the connecting plate disposed at the side of the light guide plate to be connected with another member. The through hole is formed in the connecting plate. The nut is press-fitted and fixed in the through hole, and the other member are connected to the connecting plate with the screw being threaded into the nut. A closest portion of the end of the connecting plate which is opposite to the pressing member, the portion being closest to the through hole, or a portion of the pressing member which is opposite to the connecting plate, the portion being opposite to the closest portion, has a recessed shape. Even if the end of the connecting plate is deformed so as to protrude by the nut being press-fitted into the through hole, the recessed shape counteracts the deformation, thereby preventing the connecting part from interfering with the pressing member.

Also, in the present invention, the recessed portion of the connecting plate or the pressing member is longer than the diameter of the through hole, thus the deformation for the length greater than the diameter of the through hole is counteracted.

Furthermore, in the present invention, the light source which emits light to the edge face of the light guide plate is fixed on the connecting plate that dissipates heat from the light source. When the end of the connecting plate deforms so as to protrude, the pressing member and the light guide plate deviate with respect to the connecting plate, and light from the light source fixed on the connecting plate leaks without entering the edge face of the light guide plate, causing leaked light. The leaked light is prevented from occurring by counteracting the deformation.

In the present invention, the positional deviation of the light guide plate does not occur because the interference of the component that pushes the pressing member holding the light guide plate away from the light guide plate is prevented. Therefore, the present invention provides excellent effects such as preventing the deterioration in display quality of an image due to positional deviation of the light guide plate.

The above and further objects and features of the invention will more fully be apparent from the following detailed description with accompanying drawings.

DETAILED DESCRIPTION

The present invention will be described below in detail based on the drawings illustrating the embodiments thereof.

Embodiment 1

Figure 1:
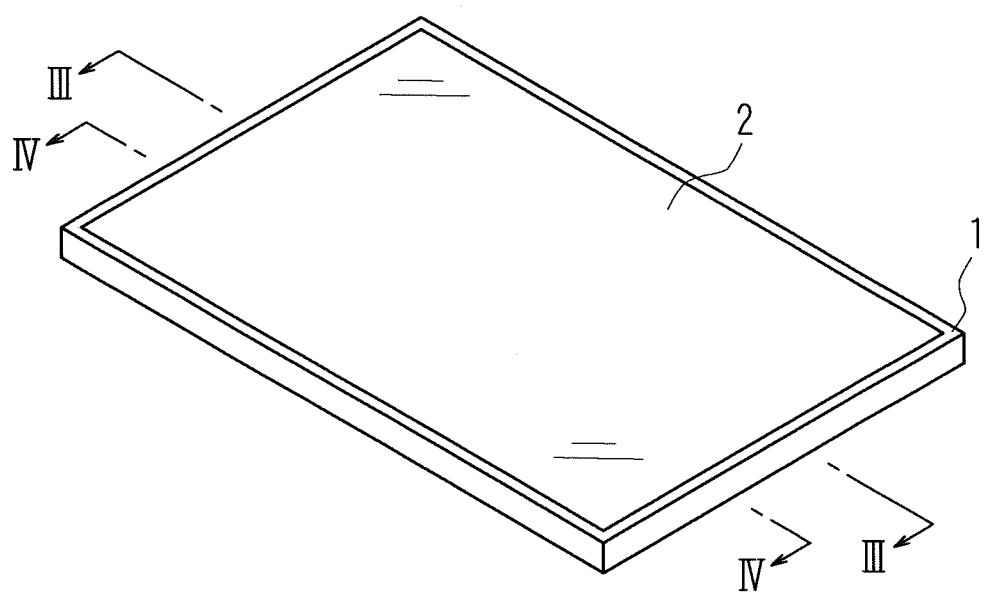
FIG. 1 is a perspective view illustrating an external appearance of a display apparatus.
Figure 2:
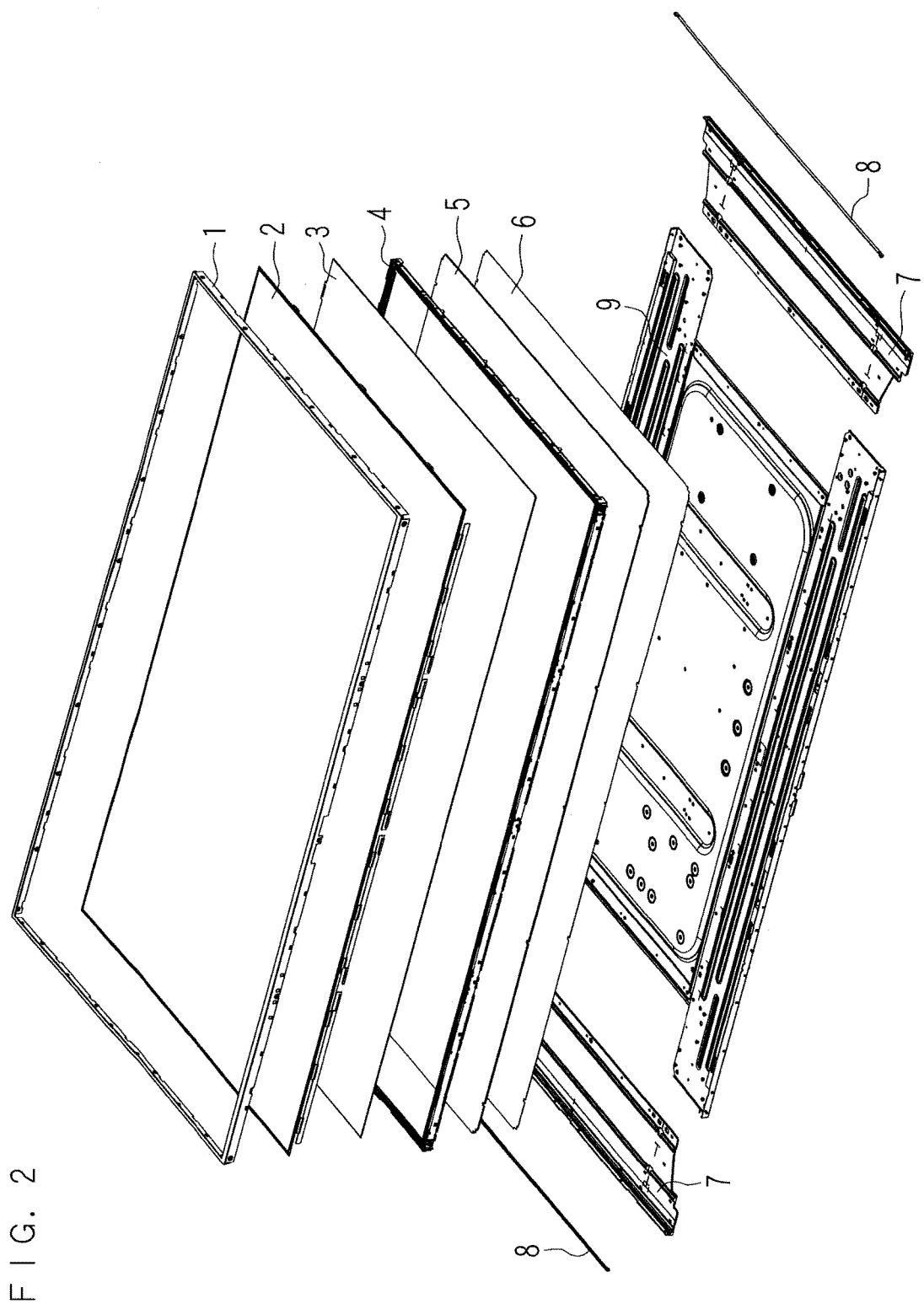
FIG. 2 is an exploded perspective view of the display apparatus.

FIG. 1 is a perspective view illustrating an external appearance of a display apparatus, and FIG. 2 is an exploded perspective view of the display apparatus. The display apparatus is, for example, a television receiver. The front side direction of the display apparatus corresponds to the upper side direction of FIG. 1 and FIG. 2. The display apparatus is provided with a non-light emitting type display panel 2 having a rectangular plate shape. The display panel 2 is illuminated by a backlight device from the back side to display an image. The display panel 2 is, for example, a liquid crystal panel. The peripheral edge of the display panel 2 is covered by a bezel 1. The bezel 1, which is a frame-shaped metal member, covers the peripheral edge of the front surface of the display apparatus and the side surfaces thereof. At the back side of the display panel 2, an optical sheet 3 for diffusing and concentrating light from the backlight device is disposed. The optical sheet 3 is so formed that a plurality of sheets, such as a sheet having a function to diffuse light from the backlight device, a sheet having a function to concentrate light, are layered, through which light transmits.

At the back side of the optical sheet 3, a front chassis 4 of a rectangular frame shape is disposed. The front chassis 4, which is made of resin, supports the display panel 2 and the optical sheet 3 from the back side thereof. The front chassis 4 may be made of metal. At the back side of the front chassis 4, a light guide plate 5 of a rectangular plate shape is disposed. And at the back side of the light guide plate 5, a reflective sheet 6 of the same shape as the light guide plate 5 is disposed. The light guide plate 5 receives light entering from an edge face thereof and emits light in a planar shape from the front surface serving as a light emitting surface. Light emitted from the light guide plate 5 illuminates the display panel 2 from the back side. At the back side of the area close to both short sides of the reflective sheet 6, metal-made heat sinks 7 and 7 for dissipating heat generated from a light source are disposed. A light source 8 that emits light to the light guide plate 5 is mounted on each of the heat sinks 7 and 7. The light source 8 is so formed that an LED is mounted on a substrate for LED. The light source 8 may be other than an LED. The heat sinks 7 and 7 are preferably made of metal with high heat dissipation such as aluminum to enable heat from the light source 8 to be efficiently dissipated. On the back side of the reflective sheet 6 and the heat sinks 7 and 7, back chassis 9 is disposed. The back chassis 9, which is a metal-made member, forms the back surface of the display apparatus. The backlight device according to the present embodiment is formed with the front chassis 4, the light guide plate 5, the reflective sheet 6, the heat sinks 7, and the light source 8.

Figure 3:
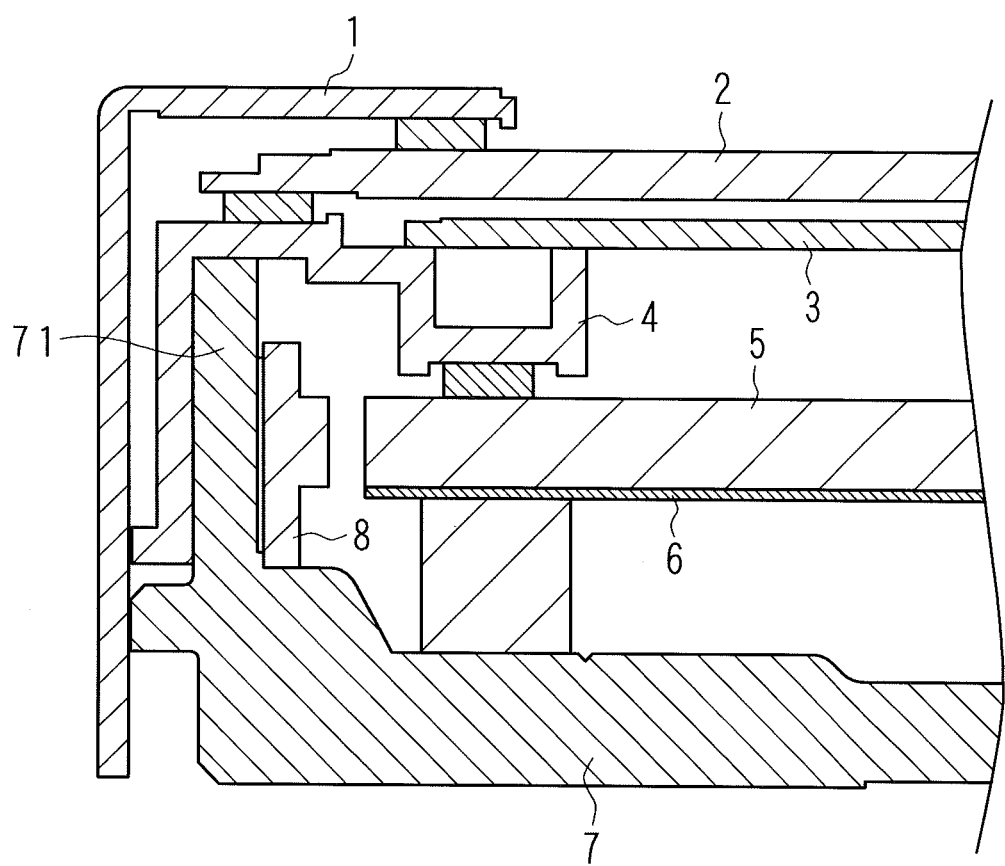
FIG. 3 is an enlarged cross-sectional view illustrating a part of a cross section taken from the line III-III in FIG. 1.

FIG. 3 is an enlarged cross-sectional view illustrating a part of the cross section taken from the line III-III in FIG. 1. FIG. 3 is the enlarged cross-sectional view taken from the line III-III in FIG. 1 illustrating a part close to a short side of the display apparatus. An upper side of FIG. 3 corresponds to the front side of the display apparatus. A part of the bezel 1 is disposed at the front side of the peripheral edge of the display panel 2, and a part of the front chassis 4 is disposed at the back side thereof. The bezel 1 and the front chassis 4 hold the display panel 2 with spacers interposed. The front chassis 4 makes contact with the back surface of the optical sheet 3. Moreover, a part of the front chassis 4 is disposed at the front side of the peripheral edge of the light guide plate 5, and the heat sink 7 is disposed at the back side of the reflective sheet 6. The front chassis 4 and the heat sink 7 hold the light guide plate 5 and the reflective sheet 6 with spacers interposed. The heat sink 7 supports the light guide plate 5 from the back side, and the front chassis 4 presses the light guide plate 5 toward the heat sink 7, to define the position of the light guide plate 5. The light source 8 is disposed at the position where the LED included therein is opposite to the edge face of the light guide plate 5. The front chassis 4 corresponds to a pressing member, and the heat sink 7 corresponds to a supporting member. Although the optical sheet 3 is disposed at the front side of the front chassis 4 in the present embodiment, the optical sheet 3 may be disposed at the back side of the front chassis 4. That means, the present invention may have a configuration in which the optical sheet 3, the light guide plate 5 and the reflective sheet 6 are held between the front chassis 4 and the heat sink 7.

The heat sink 7 has a connecting part 71 to which the bezel 1 is connected. The connecting part 71, having a plate shape, is so provided as to protrude from a part of the heat sink 7 along the back surface of the light guide plate 5 toward the front side. The connecting part 71 crosses a plane including the face of the light guide plate 5, is along the edge face of the light guide plate 5, and is disposed at the side of the light guide plate 5. A front side end of the connecting part 71 protrudes further frontward than the face of the light guide plate 5, and partially makes contact with the back surface of the front chassis 4. The light source 8 is fixed at a position opposite to the edge face of the light guide plate 5 on the connecting part 71. Furthermore, a part of the front chassis 4 protrudes backward and is disposed at the outer side of the connecting part 71. The bezel 1 covers the side of the front chassis 4 and the heat sink 7. The connecting part 71 corresponds to a connecting plate.

Figure 4:
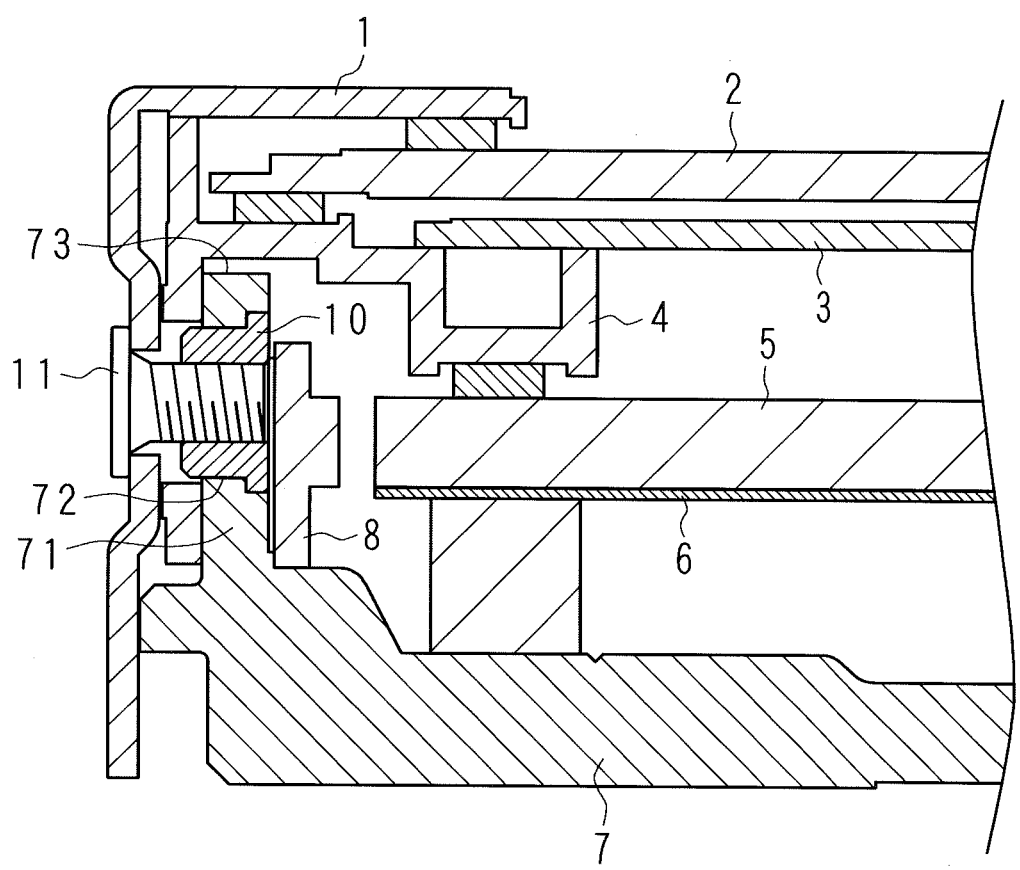
FIG. 4 is an enlarged cross-sectional view illustrating a part of a cross section taken from the line IV-IV in FIG. 1.

FIG. 4 is an enlarged cross-sectional view illustrating a part of the cross section taken from the line IV-IV in FIG. 1. FIG. 4 illustrates the cross section of the part where the bezel 1 and the front chassis 4 are connected to the connecting part 71 with a screw 11. A nut 10 is embedded in the connecting part 71. The screw 11 penetrates the bezel 1 and the front chassis 4 from the side of the display apparatus to be threaded into the nut 10, whereby the bezel 1 and the front chassis 4 are connected to the connecting part 71. A plurality of places along the connecting part 71 are connected with screws 11. When the heat sink 7 is made of metal which has high heat dissipation and is softer than iron, such as aluminum, and the screw hole is directly formed in the connecting part 71, the strength of a screw thread will be insufficient. Therefore, embedding the nut 10 in the connecting part 71 ensures the fastening with the screw 11.

Figure 5:
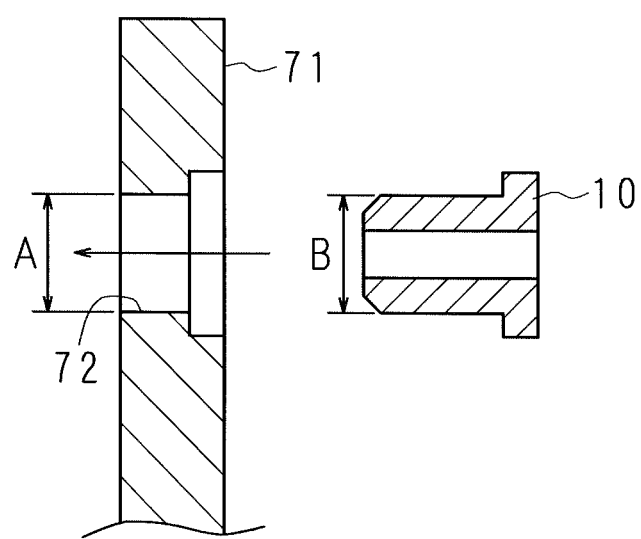
FIG. 5 is a schematic cross-sectional view illustrating a method for embedding a nut in a connecting part.
Figure 6:
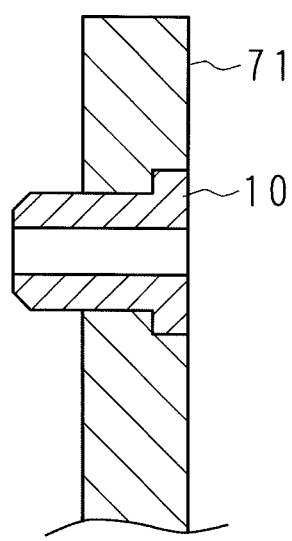
FIG. 6 is a schematic cross-sectional view illustrating a method for embedding the nut in the connecting part.

FIG. 5 and FIG. 6 are schematic cross-sectional views illustrating a method for embedding the nut 10 in the connecting part 71. A through hole 72 is formed in advance in the connecting part 71 of a plate shape. As shown in FIG. 5, the diameter A of the through hole 72 is slightly smaller than the outer diameter B of the nut 10. As shown by the arrow in FIG. 5, the nut 10 is press-fitted into the through hole 72 from the inside toward the outside. The nut 10 is press-fitted such that the inside surface of the connecting part 71 and the end surface of the nut 10 facing the inner side of the display apparatus are made substantially flush, and thus being embedded in the connecting part 71 as shown in FIG. 6. It is noted that the fixation of the nut 10 to the connecting part 71 may be reinforced by using an adhesive or other methods.

Figure 7:
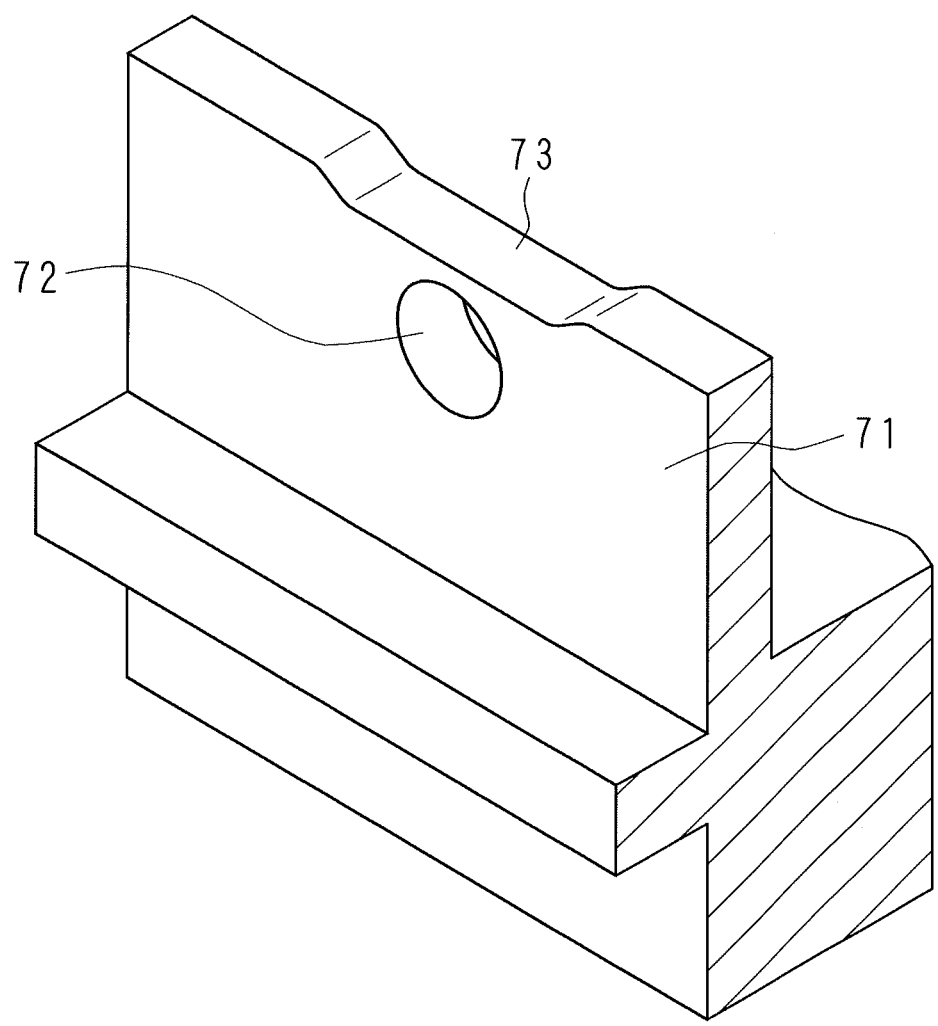
FIG. 7 is a schematic perspective view illustrating the front side end of the connecting part.

FIG. 7 is a schematic perspective view illustrating the front side end of the connecting part 71. FIG. 7 is a partially cut-out view of the connecting part 71 before the nut 10 is press-fitted into the through hole 72. A recessed part 73 which is closest to the through hole 72 is recessed in comparison with other portions of the front side end of the connecting part 71. The recessed part 73 includes a portion, which is closest to the through hole 72, of the front side end of the connecting part 71. The recessed part 73 along the front side end of the connecting part 71 preferably has a length greater than the diameter of the through hole 72 and not smaller than the outer diameter of the nut 10. Press-fitting the nut 10 into the through hole 72 slightly deforms the connecting part 71. Specifically, the connecting part 71 is deformed in such a manner that the front side end protrudes. In particular, the deformation easily occurs when the heat sink 7 is made of metal which has high heat dissipation and is softer than iron such as aluminum. The recessed part 73 is provided to prevent the protruding portion from interfering with the front chassis 4 even when the front side end of the connecting part 71 protrudes.

Figure 8:
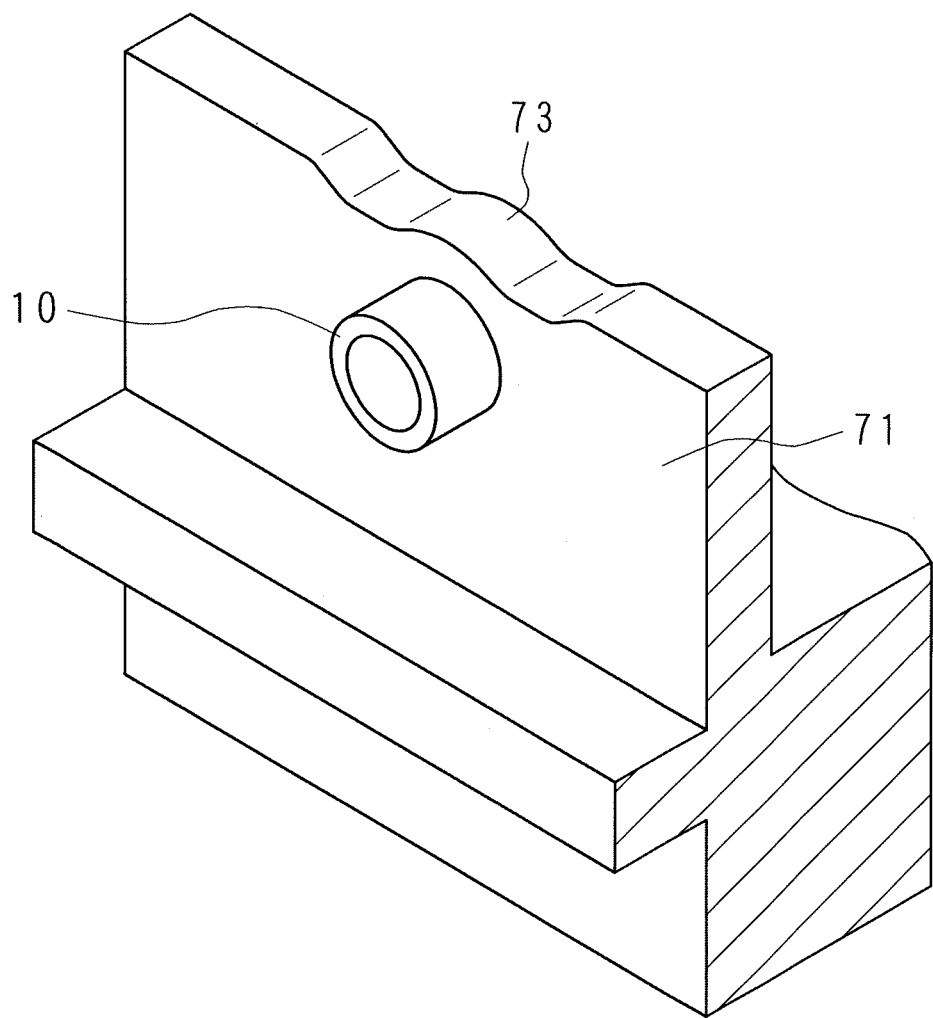
FIG. 8 is a schematic perspective view illustrating the front side end of the connecting part in which the nut is fixed.

FIG. 8 is a schematic perspective view illustrating the front side end of the connecting part 71 in which the nut 10 is fixed. FIG. 8 is a partially cut-out view of the connecting part 71 with the nut 10 being press-fitted and fixed in the through hole 72. Due to the press-fitting of the nut 10, the connecting part 71 is deformed so that the through hole 72 is expanded, and the front side end of the connecting part 71 is deformed so as to protrude to the front side. Since the recessed part 73 has a length greater than the diameter of the through hole 72, the recessed part 73 can counteract the deformation for the length not smaller that the diameter of the through hole 72. It is noted that the desirable length of the recessed part 73 is approximately 1.5 to 2 times the diameter of the through hole 72, because the length of the deformed portion due to the protrusion of the front side end of the connecting part 71 can significantly exceeds the diameter of the through hole 72.

Furthermore, the recessed part 73 is deep enough to counteract such deformation that the front side end of the connecting part 71 protrudes. For example, the recessed part 73 preferably has a depth not smaller than the length obtained by subtracting the radius of the through hole 72 from the maximum value of the outside radius of the nut 10. The deformation is counteracted even when the height of such deformation that the front side end of the connecting part 71 protrudes by the press-fitting of the nut 10 substantially reaches a height corresponding to the length by which the maximum value of the outer radius of the nut 10 exceeds the radius of the through hole 72. Since the recessed part 73 counteracts such deformation that the front side end of the connecting part 71 protrudes, the front side end of the connecting part 71 does not interfere with the front chassis 4.

As described above, in the present embodiment, the formation of the recessed part 73 on the front side end of the connecting part 71 prevents the connecting part 71 from interfering with the front chassis 4. Since the interference is prevented, the front chassis 4 is not pressed by the heat sink 7 to the direction away from the light guide plate 5. Because the front chassis 4 holding the light guide plate 5 from the front side is not separated from the light guide plate 5, positional deviation of the light guide plate 5 does not occur. The positional deviation of the light guide plate 5 causes slight positional deviation of the edge face of the light guide plate 5 from the light path of the incident light from the light source 8, and a part of the light which is to enter the edge face of the light guide plate, leaks without being able to enter it, causing leaked light. Since the position of the light guide plate 5 does not deviate, the leaked light is not generated and the amount of light entering the light guide plate 5 from the light source 8 is not decreased. A decrease in brightness of a display screen due to the decrease in the amount of light and a generation of the luminance unevenness of the display screen due to the leaked light are prevented, thus the deterioration in display quality of an image on the display apparatus is prevented.

Although the present embodiment describes the form in which the front chassis 4 is connected to the heat sink 7 which is connected with the bezel 1, the front chassis 4 may be the form of not being connected to the heat sink 7 in the present invention. In this form as well, the recessed part 73 needs to be formed to prevent the heat sink 7 from interfering with the front chassis 4, because the connecting part 71 is deformed by the nut 10 for securing the bezel 1. Moreover, although the present embodiment has described the form in which the heat sink 7 is the supporting member, the back chassis 9 may be the supporting member in the present invention. In this form, the back chassis 9 includes the connecting part at the side of the light guide plate 5, a bezel 1 and the like are connected to the connecting part with a screw 11, and a recessed part is formed on the front side end of the connecting part. In this form as well, the formation of the recessed part counteracts the deformation of the supporting member.

Embodiment 2

Figure 9:
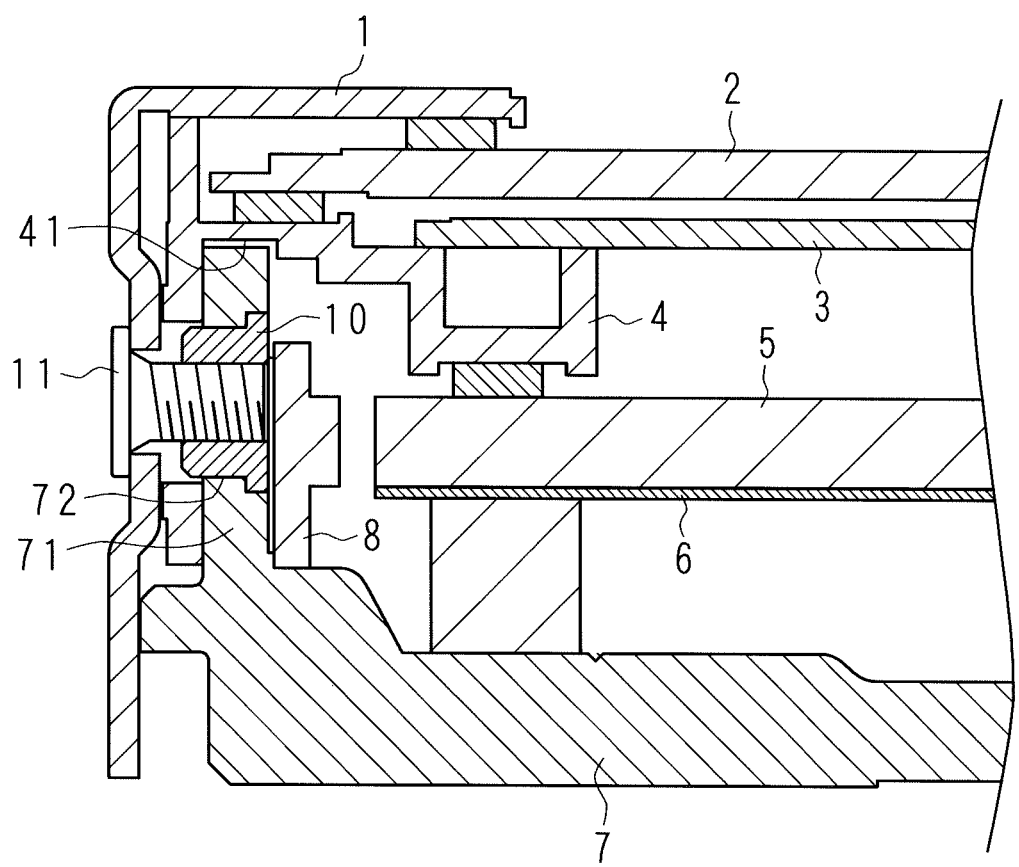
FIG. 9 is an enlarged cross-sectional view of a part where a bezel and a front chassis in Embodiment 2 are connected to a connecting part with a screw.

The overall configuration of a backlight device and a display apparatus according to Embodiment 2 is similar to that of Embodiment 1. FIG. 9 is an enlarged cross-sectional view of a part where a bezel 1 and a front chassis 4 in Embodiment 2 are connected to a connecting part 71 with a screw 11. In the present embodiment, a recessed part 41 is formed on the front chassis 4. More specifically, the recessed part 41 is formed on a portion of the front chassis 4 which is opposite to the end of the connecting part 71, the portion being closest to a through hole 72 formed in the connecting part 71. The recessed part 41 is opposite to the portion closest to the through hole 72, of the front side end of the connecting part 71. The recessed part 41 is recessed in comparison with other portions of the front chassis 4 that are opposite to the end of the connecting part 71. The recessed part 41 along the front side end of the connecting part 71 is longer than the diameter of the through hole 72. Moreover, the recessed part 41 is deep enough to counteract such deformation that the front side end of the connecting part 72 protrudes by the press-fitting of a nut 10.

In this embodiment, the front side end of the connecting part 71 deforms so as to protrude to the front side by the press-fitting of the nut 10 into the through hole 72. Since the portion of the front chassis 4, which is opposite to the protruding portion of the connecting part 71, is the recessed part 41, when the end of the connecting part 71 protrudes toward the recessed part 41, the deformation is counteracted.

The length of the recessed part 41 is longer than the diameter of the through hole 72, the recessed part 41 can thus counteract the deformation for the length not smaller than the diameter of the through hole 72. Since the recessed part 41 counteracts such deformation that the front side end of the connecting part 71 protrudes, the front side end of the connecting part 71 does not interfere with the front chassis 4.

As described above, in the present embodiment as well, the formation of the recessed part 41 on the portion of the front chassis 4, which is opposite to the end of the connecting part 71, prevents the connecting part 71 from interfering with the front chassis 4. Thus, the front chassis 4 and the light guide plate 5 do not deviate, leaked light due to the positional deviation of the light guide plate 5 is not generated, and the amount of light entering the light guide plate 5 from the light source 8 is not decreased. Consequently, as in Embodiment 1, the decrease in brightness of a display screen due to the decrease in the amount of light and the generation of the luminance unevenness of the display screen due to leaked light are prevented, and deterioration in display quality of an image on the display apparatus is prevented.

Although the present embodiment describes the form in which the front chassis 4 is connected to the heat sink 7 which is also connected with the bezel 1, the front chassis 4 may take a form of not being connected to the heat sink 7 in the present invention. In this form as well, the connecting part 71 is deformed by the nut 10 for securing the bezel 1. Thus the formation of the recessed part 41 is necessary to prevent the heat sink 7 from interfering with the front chassis 4. Furthermore, the present invention may take a form in which a back chassis 9 instead of a heat sink 7 is a supporting member. In this form, the back chassis 9 includes the connecting part existing at the side of the light guide plate 5, a bezel 1 and the like are connected to the connecting part with a screw 11, and a recessed part 41 is formed on the portion of the front chassis 4 opposite to the connecting part. In this form as well, the formation of the recessed part 41 can counteract the deformation of the supporting member.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A backlight device, comprising:
 a light source;
 a light guide plate with an edge face receiving light entering from the light source and with a flat surface emitting light;
 a bezel;
 a pressing member comprising a part extending toward the flat surface of the light guide plate for pressing a part of the flat surface side of the light guide plate, and a side part to be connected with the bezel; and
 a connecting plate extending along the edge face of the light guide plate toward the pressing member and disposed in non-parallel at a side of the light guide plate, to be connected with the bezel and having an end being opposite to the pressing member, wherein,
 a through hole is formed in the connecting plate, and
 a closest portion, which is a portion of the front side end of the connecting plate and is closest to the through hole, or an opposing portion, which is a portion of the pressing member and is opposite to the closest portion, is recessed in such a manner that the closest portion and the opposing portion are separated by a distance equal to or larger than a length at which the end of the connecting plate protrudes due to deformation of the connecting plate.

2. The backlight device according to claim 1, wherein the closest portion or the opposing portion is recessed for a length greater than a diameter of the through hole.

3. The backlight device according to claim 1, wherein a nut is press-fitted and fixed in the through hole, and the bezel is connected to the connecting plate with a screw being threaded into the nut.

4. The backlight device according to claim 1, wherein the connecting plate is made of metal, and the light source is fixed on the connecting plate.

5. A display apparatus, comprising:
a display panel for displaying an image; and
the backlight device according to claim 1 for illuminating the display panel.

6. A backlight device, comprising:
a light source;
a light guide plate with an edge face receiving light entering from the light source and with a flat surface emitting light;
a bezel;
a supporting member with a part being disposed at a back side of the flat surface of the light guide plate, for supporting the light guide plate; and
a pressing member with a part extending toward the light emitting surface side of the light guide plate, for pressing the light guide plate between the pressing member and the supporting member; and
wherein
the supporting member includes a connecting plate extending along the edge face of the light guide plate toward the pressing member and disposed in non-parallel at a side of the light guide plate, to be connected with the bezel and having an end being opposite to the pressing member,
a through hole is formed in the connecting plate, and
a closest portion, which is a portion of the front side end of the connecting plate and is closest to the through hole, or an opposing portion, which is a portion of the pressing member and is opposite to the closest portion, is recessed in such a manner that the closest portion and the opposing portion are separated by a distance equal to or larger than a length at which the end of the connecting plate protrudes due to deformation of the connecting plate.

7. The backlight device according to claim 6, wherein the closest portion or the opposing portion is recessed for a length greater than a diameter of the through hole.

8. The backlight device according to claim 6, wherein a nut is press-fitted and fixed in the through hole, and the bezel is connected to the connecting plate with a screw being threaded into the nut.

9. The backlight device according to claim 6, wherein the connecting plate is made of metal, and the light source is fixed on the connecting plate.

10. A display apparatus, comprising:
a display panel for displaying an image; and
the backlight device according to claim 6 for illuminating the display panel.

11. The backlight device according to claim 3, wherein the depth of the recess is greater than a length obtained by subtracting a radius of the through hole from a maximum value of an outside radius of the nut.

12. The backlight device according to claim 8, wherein the depth of the recess is greater than a length obtained by subtracting a radius of the through hole from a maximum value of an outside radius of the nut.

* * * * *